(12) United States Patent
Hirsch et al.

(10) Patent No.: US 12,340,127 B2
(45) Date of Patent: Jun. 24, 2025

(54) NAS CENTRAL SEQUENCER, NAS CLIENTS AND JOURNALING METHODS

(71) Applicant: HUAWEI TECHNOLOGIES CO., LTD., Shenzhen (CN)

(72) Inventors: Michael Hirsch, Hod Hasharon (IL); Itamar Ofek, Hod Hasharon (IL); Daniel Goodman, Hod Hasharon (IL); Igor Shafran, Hod Hasharon (IL); Eddy Duer, Hod Hasharon (IL); Assaf Natanzon, Hod Hasharon (IL)

(73) Assignee: Huawei Technologies Co., Ltd, Shenzhen (CN)

( * ) Notice: Subject to any disclaimer, the term of this patent is extended or adjusted under 35 U.S.C. 154(b) by 70 days.

(21) Appl. No.: 18/497,723

(22) Filed: Oct. 30, 2023

(65) Prior Publication Data
US 2024/0061622 A1 Feb. 22, 2024

Related U.S. Application Data

(63) Continuation of application No. PCT/EP2021/061362, filed on Apr. 30, 2021.

(51) Int. Cl.
*G06F 3/06* (2006.01)

(52) U.S. Cl.
CPC .......... *G06F 3/067* (2013.01); *G06F 3/0604* (2013.01); *G06F 3/0655* (2013.01)

(58) Field of Classification Search
None
See application file for complete search history.

(56) References Cited

U.S. PATENT DOCUMENTS

| | | | |
|---|---|---|---|
| 7,996,718 B1 * | 8/2011 | Ou | G06F 11/0727 714/24 |
| 2007/0220311 A1 | 9/2007 | Lewin et al. | |
| 2012/0042202 A1 | 2/2012 | Wenzel | |

\* cited by examiner

*Primary Examiner* — Brian R Peugh
(74) *Attorney, Agent, or Firm* — Leydig, Voit & Mayer, Ltd.

(57) ABSTRACT

A NAS memory controller is provided that is operatively connected to one or more NAS clients for shared memory access, where each NAS client includes a clock and is operatively connected to other NAS clients of the one or more NAS clients through a low-latency communications network. The NAS memory controller is configured to transmit an indication of a stop time and a restart time to each of the one or more NAS clients, and receive a journal of file operations from each of the one or more NAS clients after the stop time arrives. The NAS memory controller is further configured to determine a status of each journal.

20 Claims, 7 Drawing Sheets

NAS CENTRAL SEQUENCER, NAS CLIENTS AND JOURNALING METHODS

CROSS REFERENCE TO RELATED APPLICATIONS

This application is a continuation of International Application No. PCT/EP2021/061362, filed on Apr. 30, 2021, which is hereby incorporated by reference in their entireties.

FIELD

The present disclosure relates generally to the field of shared storage and data replication; and more specifically, to a network attached storage (NAS) memory controller, a NAS client, and methods for shared memory access.

BACKGROUND

Shared storages, such as Network-attached storages (NAS), are widely used as a convenient method for storing and sharing data files. The network-attached storages are known to provide faster data access, easier administration, and simple configuration, as compared to general-purpose servers also serving files. The network-attached storages store data received from multiple conventional clients in a source site and thus are commonly also referred to as a source network-attached storage. This data is further stored as a backup data at a target site, such as a target network-attached storage. Typically, data backup is used to protect and recover data in an event of data loss in the source site. Examples of the event of data loss may include, but is not limited to, data corruption, hardware or software failure in the source site, accidental deletion of data, hacking, or malicious attack. Thus, for safety reasons, a separate backup storage or the target network-attached storage is extensively used to store a backup of the data present in the source site.

Conventionally, the NAS source is constantly used by conventional NAS clients for storing new or updated data. Data replication solutions may be required to store such data from the NAS source to the NAS target as a backup. Some NAS manufacturers provide data replication solutions between their own storage devices, i.e., the NAS source and the NAS target may be required to belong to the same product manufacturer or compatible manufactures. Such solutions force customers to use the hardware and software products from the same manufacturer (or vendor) and leads to the situation of vendor lock-in, which is not desirable. In some conventional data replication solutions, gateways (e.g., routers or switches) are installed between the conventional NAS clients and NAS source. However, the conventional data replication solutions based on gateways introduce latency because some gateways include massive cache memory. Such gateway-based solutions also have inherent single-point-of-failure problems, i.e., a single flaw in the design, configuration, or implementation of a system, circuit, or component may pose a potential risk to cause the whole system to stop working. Moreover, such gateway-based solutions add network hops into the data path between the conventional NAS source and the conventional NAS clients which makes the data path longer and more fragile. Other conventional data replication solutions have an agent in each conventional NAS client, where it is the agent that may be required to reread all the data from the NAS source in order to capture and replicate that data. However, the conventional solutions that may require rereading data from the NAS source suffer from race conditions. For example, the data that is reread may have already been overwritten by new data. In other words, such conventional solutions cannot guarantee a consistent state of the data at the NAS target. Further, some conventional data replication solutions are based on continuous replication of snapshot differences through application programming interface (API). However, the conventional solutions that are based on snapshot APIs include scanning the entire file systems and can only detect that whole files have changed. This is highly inefficient and impractical in cases where applications like databases that modify specific data within very large files. For example, if a small change is made in a very large file, then the snapshot differences will indicate that the file has been modified. Thus, the whole file will be replicated rather than updating the small change made in it, making the data replication solution inefficient and impractical.

Therefore, in light of the foregoing discussion, there exists a need to overcome the aforementioned drawbacks associated with conventional data replication solutions for shared memory access.

SUMMARY

The present disclosure provides a network attached storage (NAS) memory controller, a NAS client, and methods for use in NAS memory controller and NAS client for shared memory access. The present disclosure provides a solution to the existing problem of unreliability and inefficiency in conventional data replication solutions for shared memory access, where the problem is compounded by the fact that in existing systems, there is a dependency to use compatible vendor services at source and target site, and a user is bound or forced to employ hardware and software solutions in both the source and target shared storage systems from same manufacturer (or vendor), which increases the difficulty to solve this problem of unreliable data replication and data recovery. An aim of the present disclosure is to provide a solution that overcomes at least partially the problems encountered in prior art, and provide an improved data replication solution without the need to have a programmatic access to the NAS source, without installation of gateways, without introducing any noticeable latency in the data flow, and without the requirement to reread all data written to the NAS source. Additionally, the disclosed solution eliminates NAS vendor lock-in issue as the solution does not depend on compatible vendor or manufacturer services at source and target site.

In one aspect, the present disclosure provides a NAS memory controller. The NAS memory controller is configured to be operatively connected to one or more NAS clients for shared memory access. Each NAS client comprises of a clock and is operatively connected to one another through a low-latency communications network. The NAS memory controller is further configured to transmit an indication of a stop time and a restart time to each of the one or more NAS clients; after the stop time arrives, receive a journal of file operations from each of the one or more NAS clients; and determine a status of each journal.

The NAS memory controller of the present disclosure provides an improved data replication solution for the shared memory access which is independent of NAS device manufacturers (or vendors). Thus, there is no need for the NAS source and the NAS target to belong to the same product manufacturer or compatible manufacturers. This eliminates the problem of vendor in-lock. Moreover, as the NAS memory controller is directly connected to one or more NAS clients and no gateways are used, the single-point-of-failure problems are overruled and latency in data flow is minimized. Further, as the NAS memory controller is configured to synchronize file operations of multiple NAS clients using the journal, race conditions are avoided and any possibility of reading overwritten data is suppressed. Thus, the NAS memory controller provides a reliable and efficient data replication solution for the shared memory access.

In an implementation form, the NAS memory controller is further configured to order the file operations of each journal into one time series of file operations.

The ordering of file operations of each journal into one time series of file operations at each NAS client side enables the NAS memory controller to efficiently synchronize file operations for multiple NAS clients, thereby avoiding the single-point-of-failure problems without introducing any noticeable latency in data flow between the NAS source and the one or more NAS clients.

In a further implementation form, the NAS memory controller is further configured to cause the journals to undergo conflict resolution.

By virtue of conflict resolution, any disagreement among the file operations and metadata received from the one or more NAS clients can be resolved adequately by the NAS memory controller.

In a further implementation form, the NAS memory controller is further configured to cause the journals to undergo replication.

For efficient and reliable synchronization, the journals are replicated by the NAS memory controller to ensure that no data of the one or more NAS clients is lost. This further ensures improved data replication solution without the need to have a programmatic access to the NAS source and without the requirement to reread all data written to the NAS source, as the journals includes a complete set of file operations and metadata that may be required to replay them at a remote location.

In a further implementation form, the NAS memory controller is further configured to cause the journals to undergo further processing.

The NAS memory controller process datasets of completed IOs received in the form of journals from the one or more NAS clients. This processing is executed in the background without the one or more NAS clients having to wait for the processing to finish, which helps in reliable and efficient synchronization of file operations among the one or more NAS clients without introducing any latency in the production data path.

In a further implementation form, the NAS memory controller is further configured to determine the status of each journal by determining for each of the journals if a journal indicates a successful status, and if so, determining the file operations of the journal to be crash consistent, and if the journal indicates an unsuccessful status, determining the file operations of the journal to be crash inconsistent.

Beneficially, if the file operations of the journals are crash consistent, then all of the interrelated data components are as they were at the instant of the crash (e.g., power off or reset). In other words, it captures a restore point. Thus, there is no loss of data and the synchronization process for data replication becomes reliable and efficient.

In a further implementation form, the journal of a NAS client comprises all file operations initiated by the NAS client before the stop time and are complete before the restart time.

Beneficially, by use of the journal received from each of the one or more NAS clients, file operations listed in multiple NAS clients are synchronized, and further race conditions are avoided by eradication of any possibility to reread overwritten data.

In a further implementation form, the journal includes a time stamp for each file operation.

The time stamps of file operations are useful in the maintenance of precise synchronization and resolution of conflicts associated with file operations among the one or more NAS clients.

In a further implementation form, the file operation is one of: a write operation, a metadata operation, or a cyclic redundancy check (CRC) of a read operation.

The file operations are beneficial for various purposes, such as to add new information or to make changes in existing information through write operation, to store additional information for synchronization process through metadata operation, and to detect errors through CRC of read operation. The receipt of such file operations in the form of the journal from multiple clients by the NAS memory controller (i.e., a sequencer) facilitates synchronization the file operations from multiple NAS clients.

In a further implementation form, the NAS memory controller is further configured to synchronize the clocks of the one or more NAS clients by transmitting an indication of a synchronization.

Beneficially, the accuracy of transmission of data from one or more NAS clients is increased and the possibility of errors, such as loss of data, is suppressed. Thus, the data replication solution for the shared memory access becomes more efficient and reliable based on the synchronization of clocks.

In a further implementation form, the low-latency communications network has a latency that is shorter than the latency for a file operation.

By virtue of low-latency communications network, the synchronization process becomes very precise and reliable.

In a further implementation form, the low-latency communications network is a Local Area Network (LAN) network.

By use of a common LAN network, the ability to synchronize the clocks of the NAS clients with the NAS memory controller increases with high accuracy.

In a further implementation form, the indication of a restart time is the indication of a stop time added to a stop time period known to the one or more NAS clients.

The stop time added to a stop time period known to one or more NAS clients, ensures that some extra threshold time is provided to the NAS clients to complete the file operations, which were initiated before the stop time and are complete before the restart time. This further ensures that the crash consistency of the data and eradicates the possibility of loss of data.

In another aspect, the present disclosure provides a method for use in a NAS memory controller, the NAS memory controller is being configured to be operatively connected to one or more NAS clients for shared memory access. Each client comprises of an IO clock and being operatively connected to one another through a low-latency communications network. The method in the NAS memory controller comprises: transmitting an indication of a stop time and an indication of a restart time to each of the one or more NAS clients; after the stop time arrives, receiving a journal of file operations from each of the one or more NAS clients; and determining a status of each journal.

The method provides an efficient and reliable data replication and recovery solution for the shared memory access by capturing and accurately sequencing the file operations of multiple NAS clients, without the need to have a programmatic access to the NAS source, without installation of gateways, without introducing any noticeable latency in the data flow, and without the requirement to reread all data written to the NAS source. The method executed by the NAS memory controller achieves all the advantages and effects of the NAS memory controller of the present disclosure.

In yet another aspect, the present disclosure provides a computer-readable media which comprises of instructions that when loaded into and executed by a NAS memory controller enables the NAS memory controller to execute the method of aforementioned aspect.

The computer-readable media product achieves all the advantages and effects of the respective method of the present disclosure.

In yet another aspect, the present disclosure provides a NAS client being configured to be operatively connected to a NAS memory controller comprising a memory controller through a low-latency communications network for shared memory access. The NAS client comprising a clock and a controller, the controller being configured to: synchronize the clock; receive an indication of a file operation; register the file operation in a journal; receive an indication of a stop time and an indication of a restart time from the NAS memory controller; determine a stop time based on the indication of a stop time; determine a restart time based on the indication of a restart time; as the stop time arrives refrain from executing further file operations; determine a status of the journal; transmit the journal of file operations to the NAS memory controller; and as the restart time arrives resume execution of the further file operations.

The NAS client of the present disclosure provides an improved data replication solution for the shared memory access in which each NAS client journals its own file operations independently, which avoids race conditions and any possibility of reading overwritten data is suppressed.

In yet another aspect, the present disclosure provides a method for use in a NAS client being configured to be operatively connected to a NAS memory controller through a low-latency communications network for shared memory access, where the NAS client comprises of a clock. The method in the NAS client comprises: synchronizing the clock; receiving an indication of a file operation; registering the file operation in a journal; and receiving an indication of a stop time and an indication of a restart time from the NAS memory controller. The method further comprises: determining a stop time based on the indication of a stop time; determining a restart time based on the indication of a restart time; as the stop time arrives refraining from executing further file operations; determining a status of the journal; transmitting the journal of file operations to the NAS memory controller; and as the restart time arrives, resuming execution of the further file operations.

The method executed by the NAS client achieves all the advantages and effects of the NAS client of the present disclosure.

In yet another aspect, the present disclosure provides a computer-readable media which comprises of instructions that when loaded into and executed by a controller of a NAS client enables the controller to execute the method of aforementioned aspect.

The computer-readable media product achieves all the advantages and effects of the respective method of the present disclosure.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, and features of the present disclosure would be made apparent from the drawings and the detailed description of the illustrative implementations that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
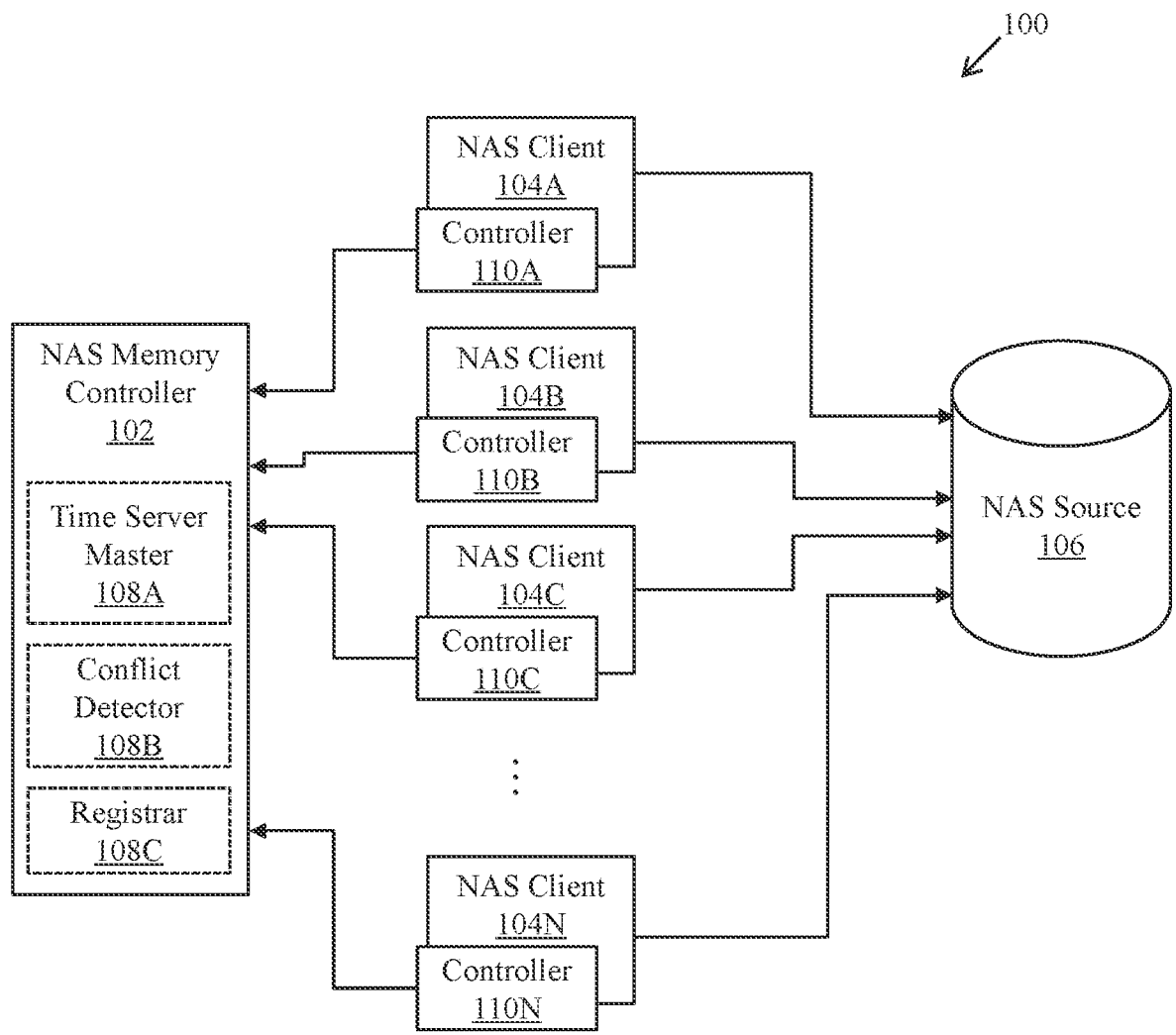
FIG. 1A is a network environment diagram of a network-attached storage (NAS) memory controller connected to one or more NAS clients for shared memory access, in accordance with an embodiment of the present disclosure.

FIG. 1A is a network environment diagram of a network-attached storage (NAS) memory controller connected to one or more NAS clients for shared memory access, in accordance with an embodiment of the present disclosure. With reference to FIG. 1A, there is shown a network environment diagram 100 that includes a NAS memory controller 102, one or more NAS clients 104A-104N, and a NAS source 106. In an implementation, the NAS memory controller 102 includes a time server master 108A, a conflict detector 108B, and a registrar 108C. Each of the one or more NAS clients 104A-104N includes a respective controller (i.e., an agent), such as controllers 110A-110N.

The NAS memory controller 102 refers to a central sequencer that notifies all clients, such as the one or more NAS clients 104A-104N, ahead of time when to insert a synchronization point into its journal stream. This coordinates synchronization points (or sync points) across all the NAS clients, such as the one or more NAS clients 104A-104N, with high accuracy. Such synchronization points define dataset boundaries, where the datasets are journal segments that are coordinated among the NAS clients. The NAS memory controller 102 includes suitable logic, circuitry, interfaces, and/or code that is configured to communicate with the one or more NAS clients 104A-104N. Examples of implementation of the NAS memory controller 102 may include, but is not limited to a central sequencer, a central data processing device, a NAS clients' file operations journal consolidation device, and the like.

The NAS memory controller 102 includes the time server master 108A, the conflict detector 108B, and the registrar 108C. The time server master 108A is configured to provide time synchronization signals to a number of slave clocks, such as the clocks of one or more NAS clients 104A-104N, communicatively coupled on a common network, such as a local area network (LAN). Typically, the time server master 108A maintains accurate time from a hardware clock source, such as the NAS memory controller 102. The conflict detector 108B is configured to detect potential conflicts associated with data access of the one or more NAS clients 104A-104N, and resolve them, if they exist. When datasets, i.e., journal segments containing file operations and metadata of the one or more NAS clients 104A-104N, are received from all registered clients, such as the one or more NAS clients 104A-104N, such datasets are processed at the NAS memory controller 102, and at least the conflict detector 108B is responsible for conflict detection and resolution by such processing. In an implementation, the one or more NAS clients 104A-104N are configured to register themselves to a common sequencer entity, i.e., the NAS memory controller 102, when a network share (e.g., NAS source 106) is mounted. In such a case, the registrar 108C of the NAS memory controller 102 is configured to maintain records of such registered one or more NAS clients 104A-104N when the network share is mounted (e.g., by use of "my-server:/share" which may be also referred to as a NAS share).

Each of the one or more NAS clients 104A-104N refers to a client that is communicatively coupled to the NAS source 106 for data access and storage. The one or more NAS clients 104A-104N are operatively connected to one another and also to the NAS memory controller 102 through a low-latency communications network, such as LAN or WLAN. The one or more NAS clients 104A-104N may be a heterogeneous group of clients, where each of the one or more NAS clients 104A-104N include suitable logic, circuitry, and interfaces that is configured to remotely access data from the NAS source 106. Each of the one or more NAS clients 104A-104N may be associated with a user who may perform specific file operations and further store the data associated with such file operations to the NAS source 106. Each of the one or more NAS clients 104A-104N includes a controller 110A-110N (such as an agent) to track and coordinate the file operations of the one or more NAS clients 104A-104N. Examples of the one or more NAS clients 104A-104N include, but are not limited to, a thin client, a laptop computer, a desktop computer, a smartphone, a wireless modem, or other computing devices.

The NAS source 106 refers to a file-level computer data storage connected to a computer network, such as a low-latency communications network, which provides data access to a heterogeneous group of one or more NAS clients 104A-104N. The NAS source 106 includes suitable logic, circuitry, and/or interfaces that is configured to receive and store data from the one or more NAS clients 104A-104N. In an implementation, the NAS source 106 may include a NAS head and a NAS storage array. The NAS source 106 supports multiple file-service protocols, and may enable users to share (i.e., receive or transmit) file data across different operating environments, such as even UNIX or windows, etc. In an example, the NAS source 106 may include one or more hard disk drives, solid state drives or persistent memory modules operated as a logical storage, or may be arranged into logical, redundant storage containers or Redundant Array of Inexpensive Disks (RAID).

In one aspect, the present disclosure provides a NAS memory controller 102,
the memory controller 102 being configured to be operatively connected to one or more NAS clients 104A-104N for shared memory access, each client comprising a clock and being operatively connected to one another through a low-latency communications network, and
the memory controller 102 being configured to:
transmit an indication of a stop time and a restart time to each of the one or more NAS clients 104A-104N;
after the stop time arrives receive a journal of file operations from each of the one or more NAS clients 104A-104N;
determine a status of each journal.

The NAS memory controller 102 is configured to be operatively connected to one or more NAS clients 104A-104N for shared memory access. The NAS memory controller 102 is configured to be operatively connected to the one or more NAS clients 104A-104N via a wired or a wireless network using known protocols, including, but not limited to, LAN, WLAN, Internet Protocol (IP), and the like. As shown in the FIG. 1A, the NAS memory controller 102 is directly connected to one or more NAS clients 104A-104N in a common network and no gateways are used or network hops are added between the NAS clients 104A-104N and the NAS source 106, which avoids the single-point-of-failure problems due to gateways and additionally latency in data flow is minimized. In an example, the shared memory access, such as the NAS source 106, provides scalable and shared storage for multiple NAS clients 104A-104N and may act as primary storage for storing data, such as production data.

In operation, in accordance with an embodiment, each of the one or more NAS clients 104A-104N includes an agent, such as the controllers 110A-110N, which is configured to perform control flow operations in each of the one or more NAS clients 104A-104N. Examples of such control flow operations include, but are not limited to: 1) registration; 2) time synchronization; 3) file operations tracking and journaling; and 4) periodic dataset-sync operations. In the registration, each of the one or more NAS clients 104A-104N is configured to perform registration with a common sequencer entity, such as the NAS memory controller 102, when a network share, such as the NAS source 106, is mounted and deregistration when dismounted. Once the registration is accomplished, in the time synchronization operation, the controllers 110A-110N of one or more NAS clients 104A-104N synchronize the clocks of one or more NAS clients 104A-104N with the time server master 108A of the NAS memory controller 102. The time synchronization is achieved with accuracy higher than the time taken for a NAS I/Os operation according to the time server master 108A (also referred to as master time server). In other words, the agents, such as the controllers 110A-110N, and the NAS memory controller 102 (i.e., the sequencer) perform a high accuracy time sync protocol.

In accordance with an embodiment, the controllers 110A-110N of the NAS clients 104A-104N then track file operations for network file storage, such as NAS source 106 in the file operations tracking and journaling operation. Beneficially, each client journals its own file operations independently and the file operations are timestamped. Any such operation is intercepted by each controller (such as the controllers 110A-110N) of each NAS client and journaled prior to being sent to a remote server, such as the NAS source 106 (or the NAS memory controller 102). The reply status is also recorded in the journal upon the receipt of acknowledgement from the NAS source 106. Moreover, the journals segments (i.e., datasets) are coordinated between the NAS clients, such as the one or more NAS clients 104A-104N. The datasets are sent to the NAS memory controller 102 (i.e., the central sequencer) for asynchronous processing and also replication to the target side (e.g., as backup). Such tracking of file metadata (e.g., inodes) is also used to detect conflicts at data access by the conflict detector 108B of the NAS memory controller 102. Moreover, the controllers 110A-110N support periodic dataset-sync operations and queue ongoing file operations for given fraction of time to maintain the control flow.

The NAS memory controller 102 is further configured to transmit an indication of a stop time and a restart time to each of the one or more NAS clients 104A-104N; and after the stop time arrives, receive a journal of file operations from each of the one or more NAS clients 104A-104N; and determine a status of each journal. The NAS memory controller 102 provides a reliable data replication solution by performing synchronization among the file operations of the one or more NAS clients 104A-104N. This is achieved by the transmission of an indication to one or more NAS clients 104A-104N. The indication may be a piece of information or a notification that informs the one or more NAS clients 104A-104N about the stop time and restart time for their file operations. Each of the one or more NAS clients 104A-104N is responsible for journaling its own file operations independently. In the present disclosure, as the journal is captured on each NAS client, such as the one or more NAS clients 104A-104N, at the individual file operation level, individual writes to files are captured. These writes thus can be replicated, thereby avoiding replicating large files because only a small update was applied by a user in the one or more NAS clients 104A-104N. The journaling includes all data that the one or more NAS clients 104A-104N send to the NAS source 106. Thus, there is no need to reread the data from the NAS source 106 at a later time, avoiding any possibility of a race condition and avoiding any possibility of reading overwritten data. The NAS memory controller 102 is configured to send the indication, i.e., notify all clients, such as the one or more NAS clients 104A-104N ahead of time when to insert a synchronization point into its journal stream. The stop time and restart time for their file operations establishes the synchronization point and such synchronization points are coordinated across all clients, such as the one or more NAS clients 104A-104N, with high accuracy. These synchronization points are journal segments that define dataset boundaries for each client of the one or more NAS clients 104A-104N.

In an implementation, every "X"-seconds, the NAS memory controller 102 sends a dataset-sync message to all client agents, such as the controllers 110A-110N of the one or more NAS clients 104A-104N. The dataset-sync message may include an identifier for the current dataset, or equivalently, for the next one. The dataset-sync message may further nominate a specific absolute time for closing one dataset and restarting the next one. Alternatively stated, the NAS memory controller 102 transmits the indication of the stop time and the restart time to each of the one or more NAS clients 104A-104N. The dataset is a set of file operations bound by an interval of time between these two dataset-sync messages. This interval defines potential granularity of journal in terms of consolidation and restore points, and crash-consistent failover points. The controllers 110A-110N of the one or more NAS clients 104A-104N consolidate file operation records for specific dataset interval, which may include buffering new incoming operations, waiting for pending ones to finish or marking their journal records for next dataset interval. The journal includes a complete set of operations and metadata that may be required to replay them at remote location, thereby avoiding the need to programmatically access to the NAS source 106 by any target side entity (e.g., by any secondary or backup storages or any backup application), avoiding latency in the data flow in the production data path, for example, from the one or more NAS clients 104A-104N to NAS source 106, and avoiding any need to reread all data written to the NAS source 106.

Furthermore, after the arrival of the stop time, the NAS memory controller 102 receives the journals of the file operations from one or more NAS clients 104A-104N and determines the status of each journal to ensure reliable and efficient data replication solution. When instructed to by a dataset-sync message, each agent (i.e., each controller, such as the controllers 110A-110N) closes the current dataset (n) and starts a new dataset (n+1), where the closed dataset should include all the completed IOs. The closed datasets are then sent to the NAS memory controller 102 as journals by the one or more NAS clients 104A-104N for further processing. Thus, the journals of the file operations received by the NAS memory controller 102 from the one or more NAS clients 104A-104N are expected to include closed dataset of file operations. In addition to initiating the dataset-sync messages, the NAS memory controller 102 collects status of all journals for specific dataset. For example, when the clients, such as the one or more NAS clients 104A-104N report a success status on dataset, this dataset initiated at certain time point is marked crash consistent. The success status refers to a state where all IO's initiated before the stop time complete before the restart time In accordance with an embodiment, the NAS memory controller 102 is configured to order the file operations of each journal into one time series of file operations. Each file operation of the NAS clients 104A-104N is timestamped to record the time of each file operation. The file operations are recorded in a sequence of time as it occurs. The ordering of file operations of each journal into one time series of file operations at each of the one or more NAS clients 104A-104N side enables the NAS memory controller 102 to efficiently synchronize the data for multiple NAS clients 104A-104N, avoid the single-point-of-failure problems, and reduce the latency in data flow.

In accordance with an embodiment, the NAS memory controller 102 is further configured to cause the journals to undergo conflict resolution. The conflict resolution is performed by the conflict detector 108B of the NAS memory controller 102. In an example, the journals from multiple clients, such as the one or more NAS clients 104A-104N, may arrive at different instants of time so the conflict detector 108B identifies the conflicts in their schedules and rearrange them accordingly based on the timestamped file operations, i.e., the order the file operations of each journal into one time series of file operations. The conflict detector 108B is configured to detect potential conflicts associated with data access of the one or more NAS clients 104A-104N, and resolve them, if they exist. When datasets, i.e., journal segments containing file operations metadata of the one or more NAS clients 104A-104N, are received from all registered clients, such as the one or more NAS clients 104A-104N, such datasets are processed at the NAS memory controller 102, and at least the conflict detector 108B is responsible for conflict detection and resolution by such processing. In another example, the conflict detector 108B may utilize the stop time and the restart time communicated to check for any conflicts, for example, to avoid any overwriting on same file or to find and resolve whether a conflict exist in upgradation in the previous file operation. By virtue of conflict resolution, any disagreement among the data received from the NAS clients 104A-104N can be resolved adequately.

In accordance with an embodiment, the NAS memory controller 102 is further configured to cause the journals to undergo replication. The journals of the one or more NAS clients 104A-104N comprise all the data associated with the file operations of the one or more NAS clients 104A-104N. For efficient and reliable synchronization, these journals are replicated by the NAS memory controller 102 to ensure that no data of the one or more NAS clients 104A-104N is lost. This further ensures improved data replication solution without the need to have a programmatic access to the NAS source 106 and without the requirement to reread all data written to the NAS source 106, as the journals includes a complete set of file operations and metadata that may be required to replay them at a remote location.

In accordance with an embodiment, the NAS memory controller 102 is further configured to cause the journals to undergo further processing. The NAS memory controller 102 process the data received in the form of journals from the one or more NAS clients 104A-104N. This processing is executed in the background without the one or more NAS clients 104A-104N having to wait for the processing to finish. This processing helps in reliable and efficient synchronization of data among the one or more NAS clients 104A-104N without introducing any latency in the production data path (i.e., data flow).

In accordance with an embodiment, the NAS memory controller 102 is further configured to determine the status of each journal by determining for each of the journals if a journal indicates a successful status, and if so, determining the file operations of the journal to be crash consistent, and if the journal indicates an unsuccessful status, determining the file operations of the journal to be crash inconsistent. The term "crash-consistent" refers to a fact that capturing the backup is like capturing a restore point at a given instant of an adverse event, like leading up to a given server crashing or being powered off or reset. In other words, if the file operations of the journal are crash consistent, it means such file operations and associated data can be reliably restored without any loss. When the journal is received by the NAS memory controller 102 from the one or more NAS client 104A-104N, the NAS memory controller 102 checks the status of the journal, i.e., whether the journal was sealed with success status at corresponding NAS client side within the given time period or not. The complete flow of file operations of the one or more NAS clients 104A-104N under crash consistent and crash inconsistent state is shown and described in detail in FIG. 4 and FIG. 5, respectively. Beneficially, if the file operations of the journals are crash consistent, then all of the interrelated data components are as they were at the instant of the crash (e.g., power off or reset). In other words, it captures a restore point. Thus, there is no loss of data and the synchronization process for data replication becomes reliable and efficient. One the other hand, if the file operations of the journals are crash inconsistent, then the NAS memory controller 102 informs the one or more NAS clients 104A-104N to retransmit their journals.

In accordance with an embodiment, the journal of a NAS client comprises all file operations initiated before the stop time by the NAS client that are complete or not before the restart time for that NAS client. The journal is a data structure of a journaling file system which is a fault-resilient file system. In the event of a system failure, the journal ensures that the data has been restored to its pre-crash configuration. It also recovers unsaved data and stores it in the location where it would have gone if the computer had not crashed. Here, the journal is used to record all the changes made in the file system. At the stop time $(T_n)$, each NAS client of the one or more NAS clients 104A-104N closes the current dataset "n" and exactly starts a new dataset "n+1". At this point, the closed dataset "n" that include all completed IOs is sealed and later sent as the journal to the NAS memory controller 102. Sometimes, some file operations initiated before the stop time may not be complete if the IOs are received after the expiration of the restart time for the current dataset "n". Instead of just one NAS device, as the journal is captured on each NAS client, such as the one or more NAS clients 104A-104N, at the individual file operation level, individual writes to files are captured. These writes thus can be replicated, thereby avoiding replicating large files when only a small update was applied by a user in the one or more NAS clients 104A-104N. This journal information is useful to synchronize the file operations received from the one or more NAS clients 104A-104N and to avoid race conditions by the eradication of any possibility to reread overwritten data.

In accordance with an embodiment, the journal includes a time stamp for each file operation. Time stamps of a file operation indicates the actual time of occurrence of that file operation in granularity. This information is useful in the maintenance of precise synchronization and resolution of conflicts among file operations of the one or more NAS clients 104A-104N.

In accordance with an embodiment, the file operation is one of: a write operation, a metadata operation, or a cyclic redundancy check (CRC) of a read operation. The file operations are beneficial for various purposes, such as to add new information or to make changes in existing information through write operation, to store additional information for synchronization process through metadata operation, and to detect errors through CRC of read operation.

In accordance with an embodiment, each journal comprises an indication of target, source and relevant operation data for each file operation in the journal. By the virtue of an indication of source and target, the address or location of the sender (i.e., NAS clients 104A-104N or NAS source 106) and receiver (i.e., NAS source 106 or NAS clients 104A-104N) is determined precisely and the relevant operation data for each file operation is delivered successfully.

In accordance with an embodiment, the NAS memory controller 102 is further configured to synchronize the clocks of the one or more NAS clients 104A-104N by transmitting an indication of a synchronization. In the time synchronization operation, the NAS memory controller 102 synchronize the clocks of one or more NAS clients 104A-104N with the time server master 108A of the NAS memory controller 102. Synchronization of the clocks may be required to correctly capture and sequence the file operations of multiple NAS clients 104A-104N. Beneficially, the accuracy and reliability of transmission of data from one or more NAS clients 104A-104N is increased and the possibility of errors, such as loss of data, is suppressed. If clocks are not synchronized then replication operations can face problems or fail and even time drifts may occur. The NAS memory controller 102 proactively avoids such situations by performing highly accurate time synchronizations.

In accordance with an embodiment, the low-latency communications network has a latency that is shorter than the latency for a file operation. Since the NAS memory controller 102 is directly connected to one or more NAS clients 104A-104N in a common communication network and no gateways are used or network hops are added between the one or more NAS clients 104A-104N and the NAS source 106, the single-point-of-failure problems due to gateways is avoided and additionally latency in data flow is minimized. Hence, the accuracy in terms of latency of this low-latency communications network is high, where the accuracy only needs to be more accurate (e.g., shorter) than the length of time needed for a file operation to avoid time drift.

In accordance with an embodiment, the low-latency communications network is a Local Area Network (LAN) network. The LAN network provides the ability to synchronize the clocks of multiple NAS clients 104A-104N with high accuracy.

In accordance with an embodiment, the indication of a restart time is transmitted along the indication of a stop time. The indication may be a piece of information or a notification that informs the one or more NAS clients 104A-104N about the stop time and restart time for their file operations. The stop time may be referred to as a time by which all the clients, such as the one or more NAS clients 104A-104N, close the current dataset (n) and start a new dataset (n+1). On the other hand, the restart time may be referred to as a deadline, by which all the clients, such as the one or more NAS clients 104A-104N, are expected to seal their journals in respect to dataset (n) and later send it to the NAS memory controller 102 to make such closed dataset to be crash consistent. Moreover, no IO writes are communicated by the one or more one or more NAS clients 104A-104N between the time interval between the stop time and the restart time. The indication of the restart time may be sent together with the indication of the stop time, which ensures the crash consistency of the data and eradicates the possibility of loss of data. The NAS memory controller 102 notifies all clients, such as the NAS clients 104A-104N, ahead of time when to insert a synchronization point into its journal stream, i.e., when to restart and when to stop. This coordinates synchronization points (or sync points) across all the NAS clients 104A-104N with high accuracy.

In accordance with an embodiment, the indication of the restart time is the indication of a stop time added to a stop time period known to the one or more NAS clients 104A-104N. The stop time added to a stop time period known to the one or more NAS clients 104A-104N, ensures that some time period is provided to the NAS clients 104A-104N to complete the file operations already initiated before the stop time to close the current dataset (n). Moreover, no IO writes are communicated by the one or more one or more NAS clients 104A-104N between the time interval between the stop time and the restart time. After the completion of the stop time added to the stop time period known to the one or more NAS clients 104A-104N, the one or more NAS clients 104A-104N can restart the transmission of next set of file operations.

Figure 1B:
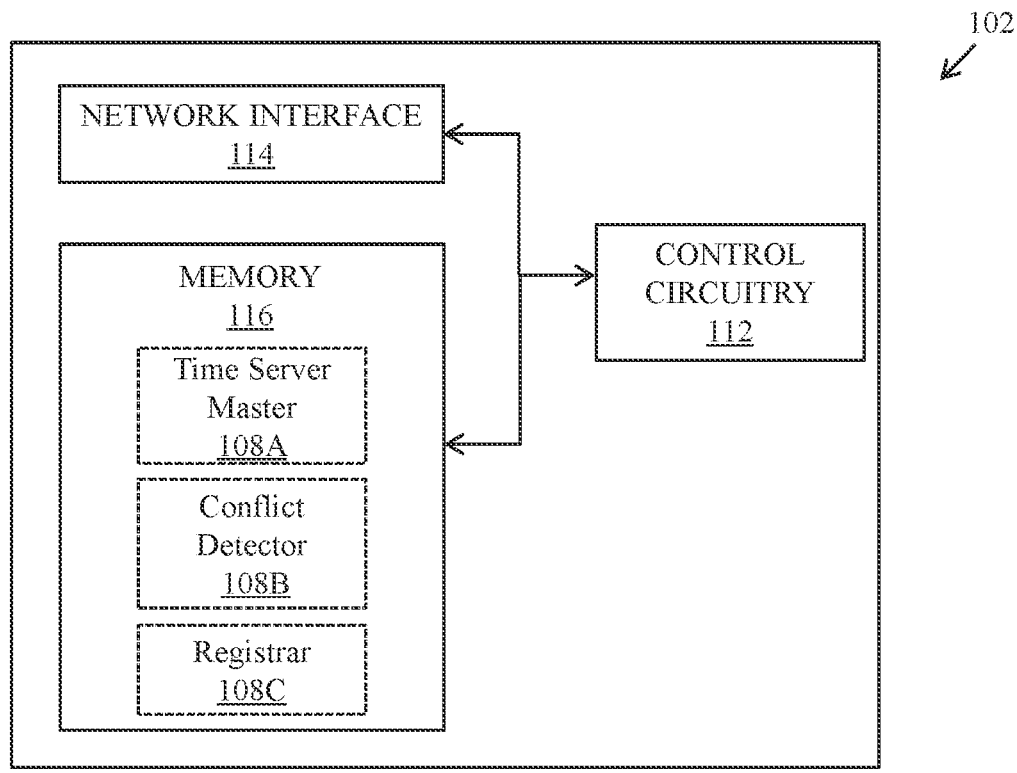
FIG. 1B is a block diagram that illustrates various exemplary components of a NAS memory controller, in accordance with an embodiment of the present disclosure.

FIG. 1B is a block diagram that illustrates various exemplary components of a NAS memory controller, in accordance with an embodiment of the present disclosure. FIG. 1B is described in conjunction with elements from FIG. 1A. With reference to FIG. 1B, there is shown a block diagram of a NAS memory controller 102. In an implementation, the NAS memory controller 102 includes a control circuitry 112, a network interface 114, and a local memory, such as a memory 116. In a case where the time server master 108A, the conflict detector 108B, and the registrar 108C are implemented as software modules, the memory 116 stores the time server master 108A, the conflict detector 108B, and the registrar 108C.

The control circuitry 112 include a suitable logic circuitry that may be configured to send a plurality of dataset-sync message to all clients, such as the one or more NAS clients 104A-104N. The examples of the control circuitry 112 may include, but is not limited to, a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or control circuitry. In an implementation, the operations executed by the NAS memory controller 102 may be executed and controlled by the control circuitry 112.

The network interface 114 include a software or hardware interface that may be configured to establish communication between the NAS memory controller 102 and the one or more NAS clients 104A-104N. The examples of network interface 114 may include, but is not limited to, a computer port, a network socket, a network interface controller (NIC), and any other network interface device.

The memory 116 include suitable logic, circuitry, and/or interfaces that may be configured to store machine code and/or instructions executable by the NAS memory controller 102 and store data received from one or more NAS clients 104A-104N. Examples of implementation of the memory 116 may include, but are not limited to, Random Access Memory (RAM), Hard Disk Drive (HDD), Flash memory, Solid-State Drive (SSD), and/or CPU cache memory.

Figure 1C:
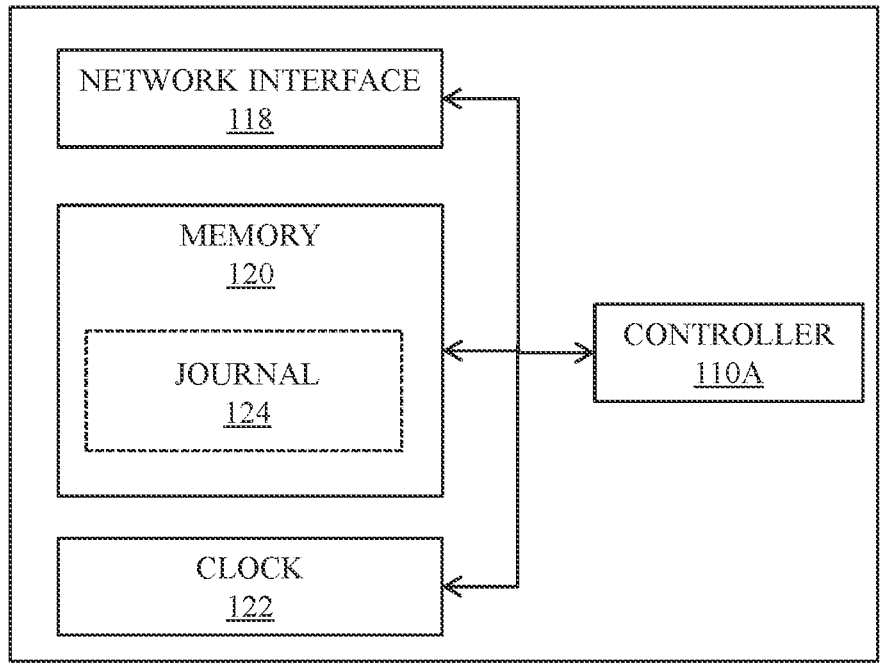
FIG. 1C is a block diagram that illustrates various exemplary components of a NAS client, in accordance with an embodiment of the present disclosure.

FIG. 1C is a block diagram that illustrates various exemplary components of a NAS client, in accordance with an embodiment of the present disclosure. FIG. 1C is described in conjunction with elements from FIG. 1A. With reference to FIG. 1C, there is shown a block diagram of a NAS client 104A. The NAS client 104A includes a controller 110A, a network interface 118, a memory 120, and a clock 122. The memory 120 further includes a journal 124.

The controller 110A is configured to monitor the control flow operations for the NAS client 104A. Examples of the controller 110A include, but is not limited to, a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or control circuitry.

The network interface 118 include a software or hardware interface that may be configured to establish communication between the NAS client 104A and the NAS memory controller 102 or the NAS client 104A and the NAS source 106. The examples of network interface 118 may include, but is not limited to, a computer port, a network socket, a network interface controller (NIC), and any other network interface device.

The memory 120 include suitable logic, circuitry, and/or interfaces that may be configured to store machine code and/or instructions executable by the controller 110A and store instruction data or notifications received from the NAS memory controller 102 or the NAS source 106. Examples of implementation of the memory 120 may include, but are not limited to, Random Access Memory (RAM), Hard Disk Drive (HDD), Flash memory, Solid-State Drive (SSD), and/or CPU cache memory.

The clock 122 of the NAS client 104A may refer to a high precision clock which is used to synchronize the file operations of the NAS client 104A with that of other NAS clients and the NAS memory controller 102.

The journal 124 of the NAS client 104A is a data structure of a journaling file system which is a fault-resilient file system. In the event of a system failure, the journal 124 ensures that the data has been restored to its pre-crash configuration. It also recovers unsaved data and stores it in the location where it would have gone if the computer had not crashed. Instead of just one NAS device, as the journal is captured on each NAS client, such as the one or more NAS clients 104A-104N, at the individual file operation level, individual writes to files are captured. These writes thus can be replicated, thereby avoiding replicating large files when only a small update was applied by a user in the one or more NAS clients 104A-104N. This journal 124 information is useful to synchronize the file operations received from the one or more NAS clients 104A-104N and to avoid race conditions by the eradication of any possibility to reread overwritten data.

In another aspect, the present disclosure provides a NAS client 104A being configured to be operatively connected to a NAS memory controller 102 through a low-latency communications network for shared memory access, the NAS client 104A comprising a clock 122 and a controller 110A, the controller 110A being configured to:
  synchronize the clock 122;
  receive an indication of a file operation;
  register the file operation in a journal 124;
  receive an indication of a stop time and an indication of a restart time from the NAS memory controller 102;
  determine a stop time based on the indication of a stop time;
  determine a restart time based on the indication of a restart time;
  as the stop time arrives refrain from executing further file operations;
  determine a status of the journal 124;
  transmit the journal 124 of file operations to the NAS memory controller 102; and
  as the restart time arrives resume execution of the further file operations.

The NAS client 104A is configured to be operatively connected to the NAS memory controller 102 through a low-latency communications network for shared memory access. The NAS client 104A is configured to be operatively connected to the NAS memory controller 102 via a wired or a wireless network, using known protocols, which includes, but is not limited to, the LAN, the WLAN, and the like. Since the NAS client 104A is directly connected to the NAS memory controller 102 and no gateways are used in the data flow, the single-point-of-failure problems are overruled and latency in data flow is minimized.

The controller 110A of the NAS client 104A is configured to synchronize the clock 122; receive an indication of a file operation; and register the file operation in a journal 124. The controller 110A of the NAS client 104A works as an agent for the NAS client 104A and performs the control flow operations associated with the NAS clients 104A. The control flow operations have been described in FIGS. 4 and 5. The controller 110A is configured to perform registration with a common sequencer entity, such as the NAS memory controller 102, when a network share, such as the NAS source 106, is mounted and deregistration when dismounted. Once the registration is accomplished, the controller 110A synchronize the clock 122 with that of the time server master 108A of the NAS memory controller 102 and with other NAS clients 104B-104N. The time synchronization is achieved with accuracy higher than the time taken for a NAS I/Os operation according to the time server master 108A. Beneficially, the controller 110A intercepts the file operation and tracks such file operations for network file storage, such as NAS source 106, followed by journaling of its own file operation independently, where each file operation is time-stamped in the journal 124.

The controller 110A of the NAS client 104A is further configured to receive an indication of a stop time and an indication of a restart time from the NAS memory controller 102; determine a stop time based on the indication of a stop time; and determine a restart time based on the indication of a restart time. When instructed by a dataset-sync message that includes the indication of the stop time and the indication of the restart time, the controller 110A closes the current dataset (n) and starts a new dataset (n+1), where the closed dataset should include all the completed IOs. The indication may be a piece of information or a notification that informs the one or more NAS clients 104A-104N about the stop time and restart time for their file operations. The stop time may be referred to as a time by which all the clients, such as the one or more NAS clients 104A-104N, close the current dataset (n) and start a new dataset (n+1). On the other hand, the restart time may be referred to as a deadline, by which all the clients, such as the one or more NAS clients 104A-104N, are expected to seal their journals in respect to dataset (n) and send it later to the NAS memory controller 102 to make such closed dataset to be crash consistent.

The controller 110A of the NAS client 104A is further configured to refrain from executing further file operations as the stop time arrives; determine a status of the journal 124; transmit the journal 124 of file operations to the NAS memory controller 102; and as the restart time arrives resume execution of the further file operations. The controller 110A of the NAS client 104A refrains the NAS client 104A from executing any further file operation after the stop time, which means no write operations are sent to the NAS source 106 after the stop time. The controller 110A of the NAS client 104A then determines the status of the journal 124 by consolidating all the file operations initiated before the stop time, which are completed into the journal 124. If all the file operations of the NAS client 104A initiated before the stop time are completed before the restart time, then the status of the journal 124 is set as success. However, if any file operation of the NAS client 104A initiated before the stop time is not completed before the restart time, then the journal 124 status is unsuccessful and that file operation is sent to the next journal. The journal 124 is sent to the NAS memory controller 102 for further processing. The controller 110A of the NAS client 104A again starts executing and sending IO writes to the NAS source 106 after the restart time.

In accordance with an embodiment, the controller 110A is further configured to determine whether to execute a file operation before the stop time based on a time period between the stop time and the restart time. The controller 110A of the NAS client 104A receives the indication of the stop time and the restart time from the NAS memory controller 102. The controller 110A of the NAS client 104A then analyses the available time period, based on the indicated stop time and restart time, to execute the file operations of the NAS client 104A. Thus, the controller 110A determines whether to execute a file operation before the stop time based on a time period between the stop time and the restart time, to ensure that all the file operations of the NAS client 104A initiated before the stop time are completed within the available time period, i.e., before the restart time.

In accordance with an embodiment, the controller 110A is further configured to determine whether to execute a file operation before the stop time based on the time period between the stop time and the restart time, wherein a file operation is buffered as a further file operation if an expected time of completion for the file operation is longer than the time period between the stop time and the restart time. If the controller 110A of the NAS client 104A predicts that the current file operation will take longer time than the available time, i.e., it cannot be completed within the available time period, then the controller 110A buffers the file operation onto a next file operation for next dataset to reduce any potential loss of data. Thus, the controller 110A of the NAS client 104A ensures that all consolidated file operations of the NAS client 104A are completed successfully and no data is lost as well as quality-of-service (QoS) is maintained.

In accordance with an embodiment, the controller 110A is further configured to determine a status of the journal 124 by determining if all outstanding file operations are acknowledged before the restart time, and if so, set a status for the file operation in the journal 124 as a success and if not set the status as unsuccessful. The journal 124 of the NAS client 104A includes a complete set of file operations and metadata that may be required to replay them at remote location. The controller 110A of the NAS client 104A determines the status of the journal 124 by consolidating all the file operations initiated before the stop time, which are completed into the journal 124. If all the file operations of the NAS client 104A initiated before the stop time are completed before the restart time, then the status of the journal 124 is set as success. However, if any file operation of the NAS client 104A initiated before the stop time is not completed before the restart time, then the journal 124 status is unsuccessful and that file operation is sent to the next journal. Thus, the controller 110A of the NAS client 104A monitors all the file operations of the NAS client 104A to ensure the crash consistency of data for efficient data replication solution.

In accordance with an embodiment, the controller 110A is further configured to start a second journal as the restart time arrives. The controller 110A of the NAS client 104A receives an indication of the stop time and restart time from the NAS memory controller 102. At the arrival of the stop time, the controller 110A of the NAS client 104A concludes the transmission of the ongoing journal. After the arrival of the restart time, the controller 110A of the NAS client 104A starts the transmission of the next journal. Thus, the controller 110A of the NAS client 104A ensures that all the journals are sent in order so that synchronization is maintained and any possibility of race condition or rereading the data from NAS source 106 is eradicated.

In accordance with an embodiment, the controller 110A is further configured to determine that a file operation that is not acknowledged before the restart time is to be moved from the journal 124 to the second journal. The journal 124 of the NAS client 104A includes a complete set of file operations and metadata that may be required to replay them at remote location. If any file operation initiated before the stop time is not completed before the restart time, then this file operation is not included in the current journal 124 rather it is moved to the next journal to ensure that no data is lost.

In accordance with an embodiment, the controller 110A is further configured to receive an indication of a synchronization of the clock from the NAS memory controller 102 and in response there to synchronize the clock 122 of the NAS client 104A. The NAS memory controller 102 sends an indication of synchronization of the clock to the NAS client 104A. The controller 110A of NAS client 104A ensures that the clock 122 of the NAS client 104A is in sync with the time server master 108A of the NAS memory controller 102. This increases the accuracy and efficiency of the data replication solution for shared memory access.

Figure 2:
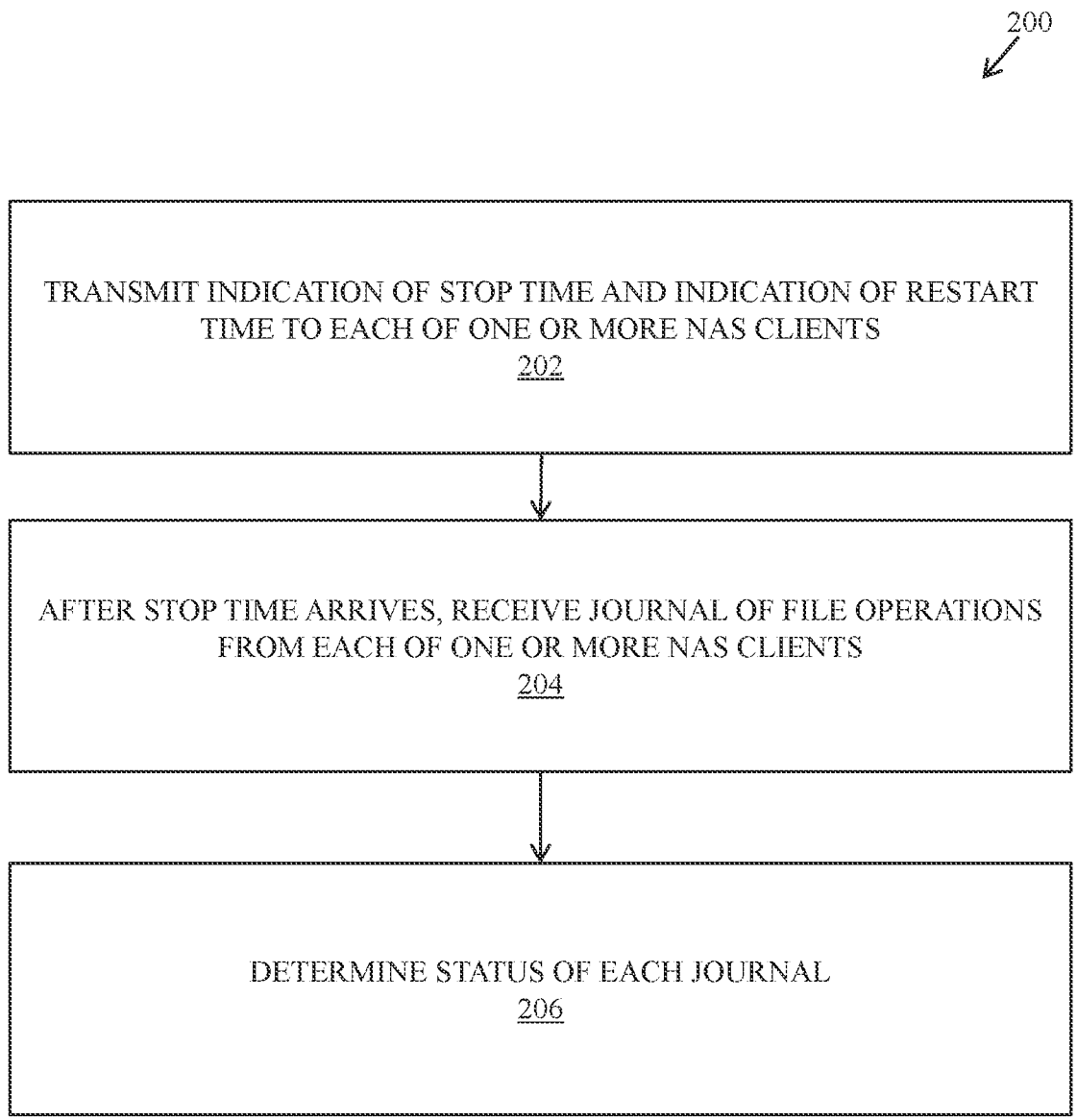
FIG. 2 is a flowchart for a method for use in a NAS memory controller, in accordance with an embodiment of the present disclosure.

FIG. 2 is a flowchart for a method for use in a NAS memory controller, in accordance with an embodiment of the present disclosure. With reference to FIG. 2, there is shown a method 200. FIG. 2 is described in conjunction with elements of FIGS. 1A and 1B. The method 200 is for use in the NAS memory controller 102 described, for example, in FIGS. 1A and 1B. The method 200 includes steps 202 to 206.

In yet another aspect, the present disclosure provides a method for use in a NAS memory controller 102, the NAS memory controller 102 being configured to be operatively connected to one or more NAS clients 104A-104N for shared memory access, each client comprising an IO clock and being operatively connected to one another through a low-latency communications network, wherein the method comprises in the NAS memory controller 102:

transmitting an indication of a stop time and an indication of a restart time to each of the one or more NAS clients 104A-104N;

after the stop time arrives, receiving a journal 124 of file operations from each of the one or more NAS clients 104A-104N; and determining a status of each journal 124.

At step 202, the method 200 comprises transmitting an indication of a stop time and an indication of a restart time to each of the one or more NAS clients 104A-104N. The indication may be a piece of information or a notification that informs the one or more NAS clients 104A-104N about the stop time and restart time for their file operations. The stop time may be referred to as a time by which all the clients, such as the one or more NAS clients 104A-104N, close the current dataset (n) and start a new dataset (n+1). Alternatively stated, the stop time marks finalizing of dataset (n) and starts new dataset (n+1). On the other hand, the restart time seals the status of previous dataset (n). Thus, the restart time can be defined as a deadline for all pending IO writes of dataset (n) to return and seal dataset (n) with success status. Moreover, no IO writes are communicated by the one or more one or more NAS clients 104A-104N between the time interval between the stop time and the restart time.

At step 204, the method 200 further comprises receiving a journal 124 of file operations from each of the one or more NAS clients 104A-104N after the stop time arrives. Each of the one or more NAS clients 104A-104N sends its journal 124 to the NAS memory controller 102 after the arrival of the stop time. The journal 124 includes a complete set of operations and metadata that may be required to replay them at remote location, thereby avoiding the need to programmatically access to the NAS source 106 by any target side entity (e.g., by any secondary or backup storages or any backup application), avoiding latency in the data flow in the production data path, for example, from the one or more NAS clients 104A-104N to NAS source 106, and avoiding any need to reread all data written to the NAS source 106.

In accordance with an embodiment, the file operation is one of: a write operation, a metadata operation, or a cyclic redundancy check (CRC) of a read operation. Optionally, the indication of the restart time is transmitted along the indication of the stop time.

At step 206, the method 200 further comprises determining a status of each journal 124. The NAS memory controller 102 sets the status of the journal 124 as crash consistent if the journal 124 from each of the one or more NAS clients 104A-104N is sealed with success status before the restart time. If the journal 124 is not sealed with success status at corresponding NAS clients before the restart time, then the status of the journal 124 is set as crash inconsistent. Alternatively stated, each journal is to be sealed at NAS client side with success or failure when restart time arrives at one or more NAS clients 104A-104N from the NAS memory controller 102. Sending journals from the one or more NAS clients 104A-104N to the NAS memory controller 102 may (or would) occur later. The NAS memory controller 102 determines status of previous dataset (n) in terms of crash consistent point examining statuses of all NAS clients but regardless the time of their arrival.

In accordance with an embodiment, the method 200 further comprises ordering of the file operations of each journal 124 into one time series of file operations. The method 200 further comprises causing the journals to undergo conflict resolution; causing the journals to undergo replication; and causing the journals to undergo further processing.

In accordance with an embodiment, the method 200 further comprises determining the status of each journal by determining for each of the journals if a journal indicates a successful status, and if so, determining the file operations of the journal to be crash consistent, and if the journal indicates an unsuccessful status, determining the file operations of the journal to be crash inconsistent.

In accordance with an embodiment, the method 200 further comprises synchronizing the clocks of the one or more NAS clients 104A-104N by transmitting an indication of a synchronization.

The steps 202 to 206 are only illustrative and other alternatives can also be provided where one or more steps are added, one or more steps are removed, or one or more steps are provided in a different sequence without departing from the scope of the claims herein.

The present method 200 uses the NAS memory controller 102 to continuously synchronize the data received from the one or more NAS clients 104A-104N for shared memory access. The present method 200 also eliminates NAS vendor lock-in as there is no dependency on compatible vendor services at source side (i.e., NAS source 106) and target side (i.e., NAS target). Moreover, the present method 200 allows an efficient and reliable data replication and recovery solution for the shared memory access by capturing and accurately sequencing the file operations of multiple NAS clients, such as the one or more NAS clients 104A-104N, without the need to have a programmatic access to the NAS source 106, without installation of gateways, without introducing any noticeable latency in the data flow, and without the requirement to reread all data written to the NAS source 106.

In yet another aspect, the present disclosure provides a computer-readable media comprising instructions that when loaded into and executed by a NAS memory controller 102 enables the NAS memory controller 102 to execute the method 200. The computer-readable media refers to a non-transitory computer-readable storage medium. Examples of implementation of the computer-readable media include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory.

Figure 3A:
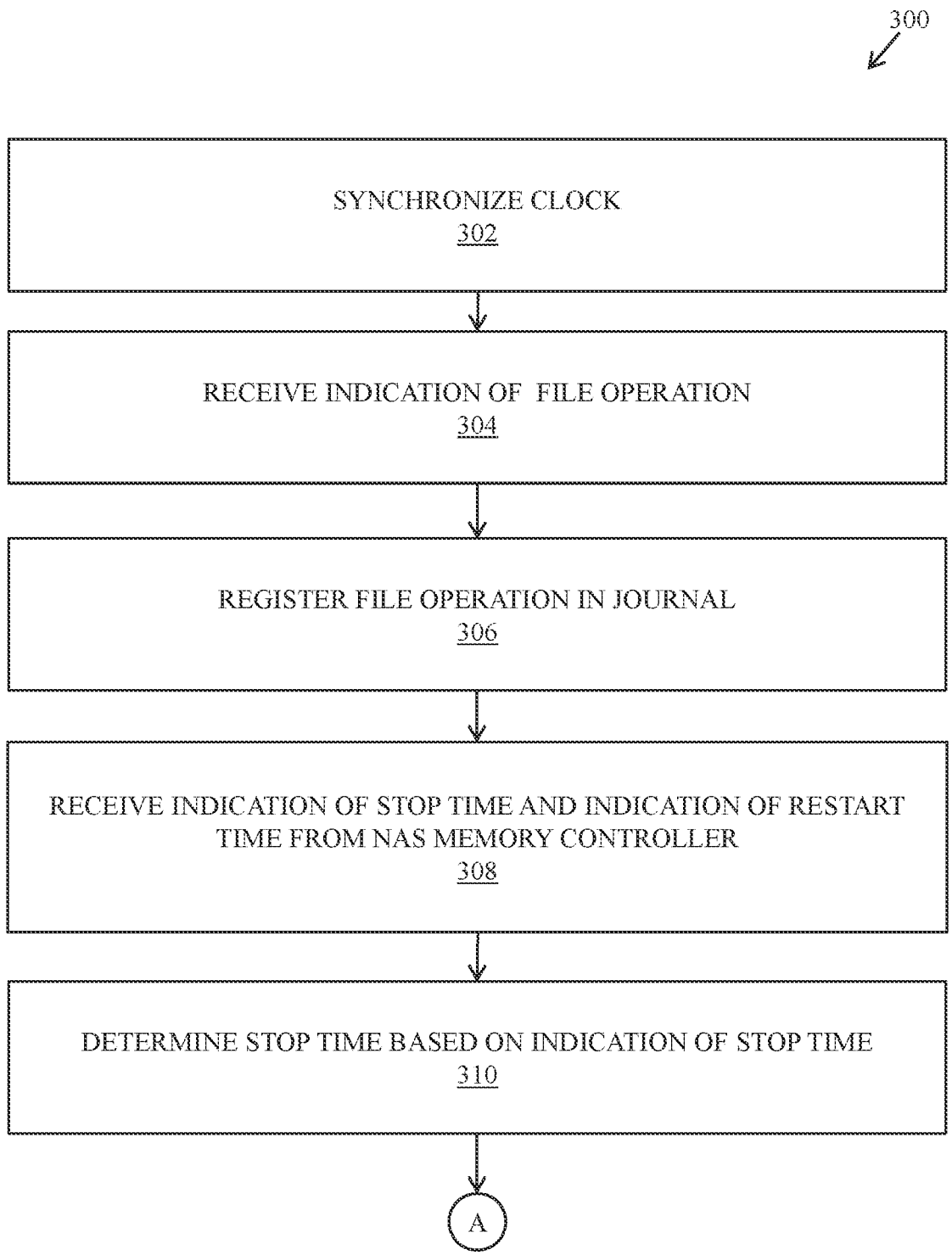
FIG. 3A and FIG. 3B collectively, is a flowchart for a method for use in a NAS client, in accordance with an embodiment of the present disclosure.
Figure 3B:
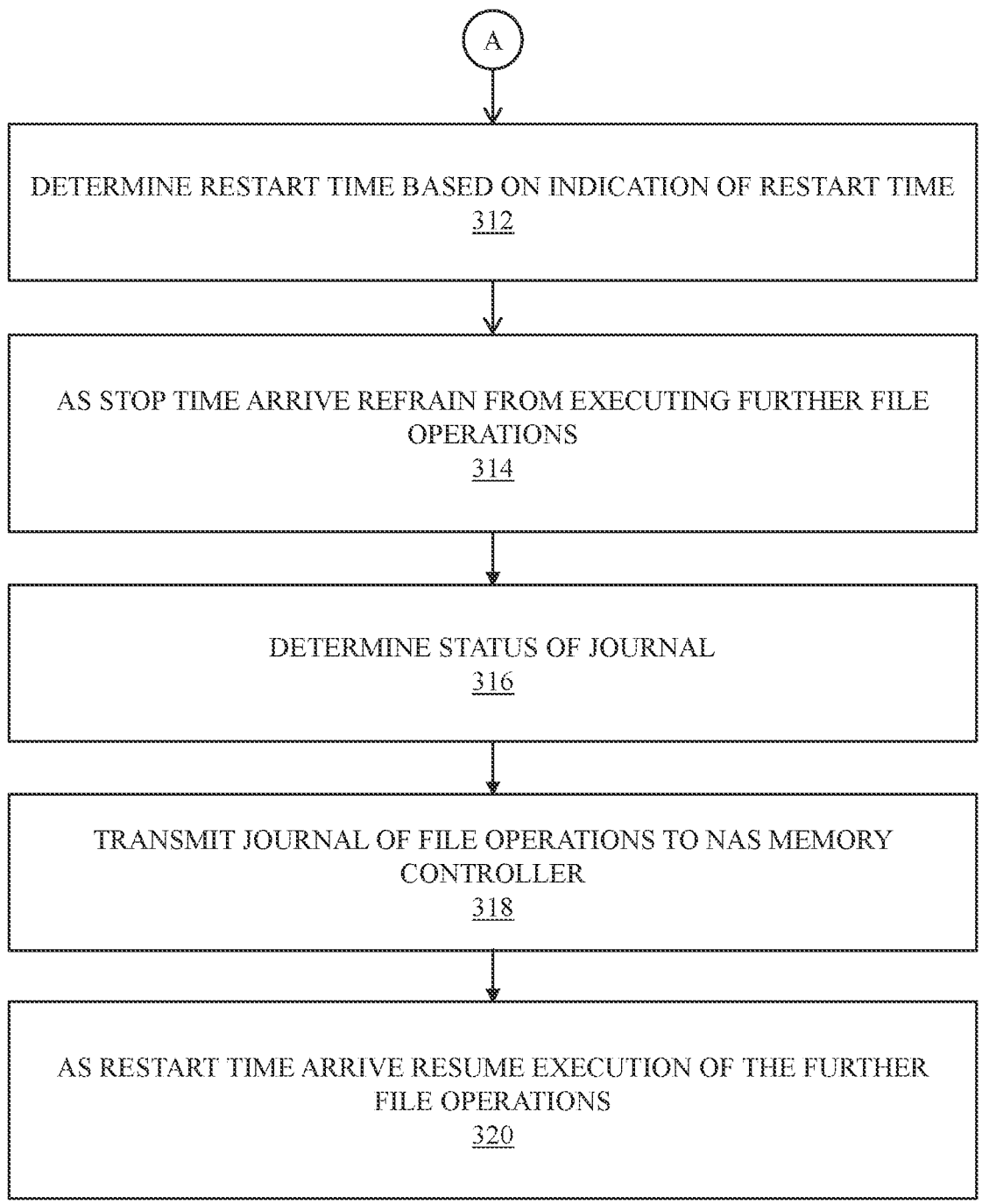

FIGS. 3A and 3B, collectively, is a flowchart for a method for use in a NAS client, in accordance with an embodiment of the present disclosure. With reference to FIGS. 3A and 3B, there is shown a method 300. FIGS. 3A and 3B is described in conjunction with elements of the FIGS. 1A and 1C. The method 300 is executed by one of the one or more NAS clients 104A-104N, such as the NAS client 104A described, for example, in FIGS. 1A and 1C. The method 300 includes steps 302 to 320.

In yet another aspect, the present disclosure provides a method for use in a NAS client 104A being configured to be operatively connected to a NAS memory controller 102 through a low-latency communications network for shared memory access, the NAS client 104A comprising a clock 122, the method comprising:

synchronizing the clock 122;
receiving an indication of a file operation;
registering the file operation in a journal 124;
receiving an indication of a stop time and an indication of a restart time from the NAS memory controller 102;
determining a stop time based on the indication of a stop time;
determining a restart time based on the indication of a restart time;
as the stop time arrives refraining from executing further file operations;
determining a status of the journal 124;

transmitting the journal 124 of file operations to the NAS memory controller 102; and as the restart time arrives resume execution of the further file operations.

At step 302, the method 300 comprises synchronizing the clock 122. The controller 110A of the NAS client 104A synchronizes its clock 122 with the time server master 108A of the NAS memory controller 102 and with other NAS clients 104B-104N. The clock 122 of the NAS client 104A may refer to a high precision clock which is used to synchronize the file operations of the NAS client 104A.

At step 304, the method 300 further comprises receiving an indication of a file operation. The file operations are beneficial for various purposes, such as to add new information or to make changes in existing information through write operation, to store additional information for synchronization process through metadata operation, and to detect errors through CRC of read operation. The NAS client 104A starts the execution of the file operation after receiving the indication of the file operation.

At step 306, the method 300 further comprises registering the file operation in a journal 124. Each file operation of the NAS client 104A needs to be registered into the journal 124. The journal 124 includes a complete set of file operations and metadata of the NAS client 104A.

At step 308, the method 300 further comprises receiving an indication of a stop time and an indication of a restart time from the NAS memory controller 102. The indication may be a piece of information or a notification that informs the NAS client 104A about the stop time and restart time for its file operations. The stop time may be referred to as a time by which the NAS client 104A closes the current dataset (n) and start a new dataset (n+1). On the other hand, the restart time may be referred to as a deadline, by which the NAS client 104A is expected to send its journal to the NAS memory controller 102 to make such closed dataset to be crash consistent. Moreover, no IO writes are communicated by the NAS client 104A between the time interval between the stop time and the restart time.

At step 310, the method 300 further comprises determining a stop time based on the indication of a stop time. The controller 110A of the NAS client 104A determines the stop time to close the current dataset (n) so that no IO writes are initiated after the stop time. This stop time is based on the indication of the stop time sent by the NAS memory controller 102 to the NAS client 104A.

At step 312, the method 300 further comprises determining a restart time based on the indication of a restart time. The controller 110A of the NAS client 104A determines the restart time as a deadline for the NAS client 104A to send its journal to the NAS memory controller 102 to make the closed dataset to be crash consistent. Moreover, the NAS client 104A starts the transmission of next set of file operations after the restart time. This restart time is based on the indication of the restart time sent by the NAS memory controller 102 to the NAS client 104A.

At step 314, the method 300 further comprises refraining from executing further file operations as the stop time arrives. The controller 110A of the NAS client 104A stops the NAS client 104A from initiating any further file operation after the stop time and sending any IO writes to the NAS source 106. This enables high accuracy in the synchronization process for data replication solution for the shared memory access.

At step 316, the method 300 further comprises determining a status of the journal 124. The journal 124 of the NAS client 104A includes a complete set of file operations and metadata that may be required to replay it at remote location. The controller 110A of the NAS client 104A determines the status of the journal 124 by consolidating all the file operations initiated before the stop time, which are completed into the journal 124. If all the file operations of the NAS client 104A initiated before the stop time are completed before the restart time, then the status of the journal 124 is set as success. However, if any file operation of the NAS client 104A initiated before the stop time is not completed before the restart time, then the journal 124 status is unsuccessful and that file operation is sent to the next journal.

At step 318, the method 300 further comprises transmitting the journal 124 of file operations to the NAS memory controller 102. The controller 110A of the NAS client 104A transmits the journal 124 of file operations to the NAS memory controller 102 after the stop time. The stop time marks finalizing of dataset (n) and starts new dataset (n+1). On the other hand, by the restart time, the controller 110A is expected to seal the status of previous dataset (n). The restart time indicates a deadline for all pending IO writes of dataset (n) to return and seal dataset (n) with success status. However, the sending of the journal 124 may occur before or after the restart time. The journal 124 includes a complete set of file operations and metadata of the NAS client 104A. This journal 124 information is used for precise synchronization of the data received from the NAS client 104A and enables an efficient and reliable data replication solution for shared memory access.

At step 320, the method 300 further comprises resuming execution of the further file operations as the restart time arrives. The controller 110A of the NAS client 104A starts the transmission of the next set of file operations after the arrival of the restart time, where the IO writes can be then sent from the NAS client 104A to the NAS source 106.

The steps 302 to 320 are only illustrative and other alternatives can also be provided where one or more steps are added, one or more steps are removed, or one or more steps are provided in a different sequence without departing from the scope of the claims herein.

The present method 300 uses the NAS client 104A that continuously journals its data to the NAS memory controller 102 for shared memory access. The present method 300 also eliminates NAS vendor lock-in as there is no dependency on compatible vendor services at source side (i.e., NAS source 106) and target side (i.e., NAS target). Moreover, as the NAS client 104A is directly connected to the NAS memory controller 102 and no gateways are used, the single-point-of-failure problems are overruled and latency in data flow is minimized. Thus, the present method 200 allows an efficient and practical data replication solution for the shared memory access by capturing and accurately sequencing the file operations of multiple NAS clients, such as the one or more NAS clients 104A-104N, without the need to have a programmatic access to the NAS source 106, without installation of gateways, without introducing any noticeable latency in the data flow, and without the requirement to reread all data written to the NAS source 106.

In yet another aspect, the present disclosure provides a computer-readable media comprising instructions that when loaded into and executed by a controller 110A of a NAS client 104A enables the NAS client 104A to execute the method 300. Examples of implementation of the computer-readable media include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory.

Figure 4:
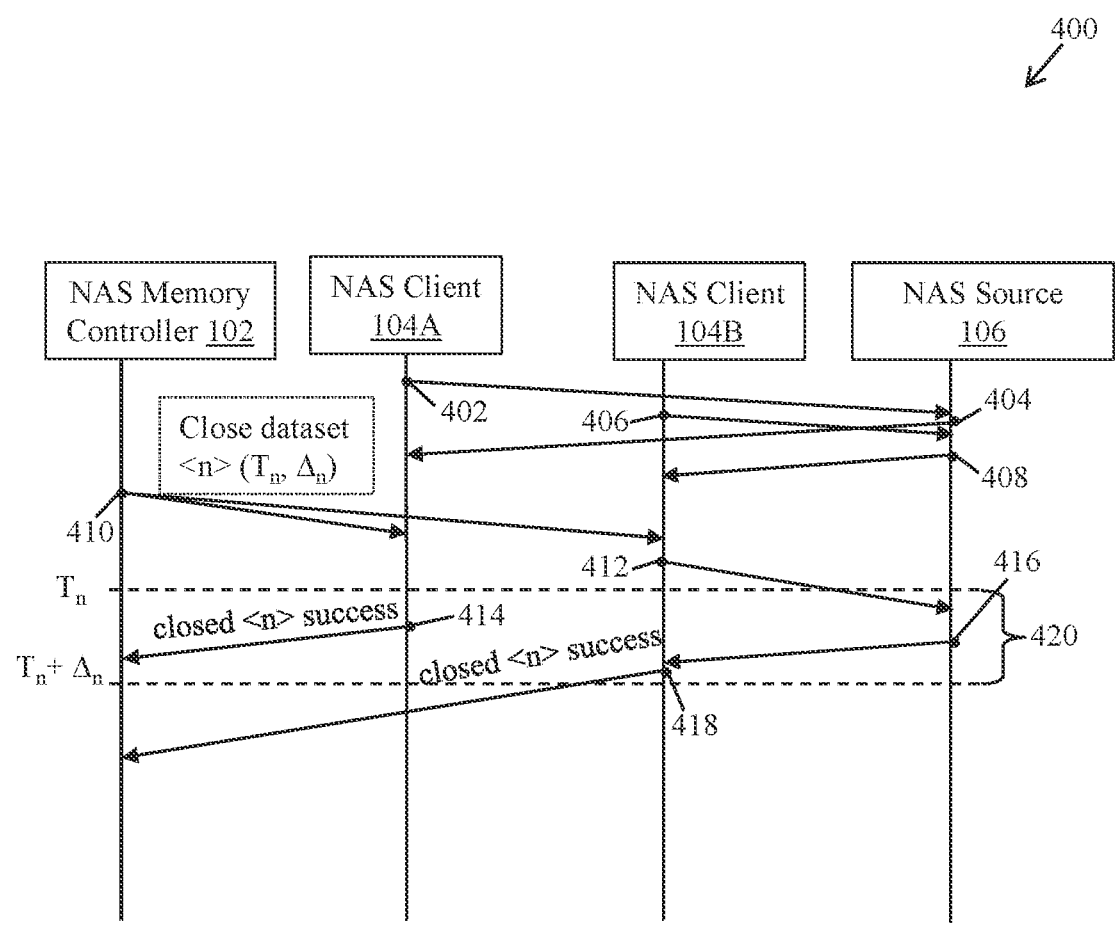
FIG. 4 is an exemplary sequence diagram that depicts crash consistent file operations, in accordance with an embodiment of the present disclosure.

FIG. 4 is an exemplary sequence diagram that depicts crash consistent file operations of the one or more NAS clients, in accordance with an embodiment of the present disclosure. FIG. 4 is described in conjunction with elements of FIGS. 1A, 1B, 1C, 2, and 3. With reference to FIG. 4, there is shown a sequence diagram 400 that depicts an exemplary sequence of operations 402 to 418. There is further shown the NAS memory controller 102, two NAS clients 104A and 104B, and a shared NAS storage, such as the NAS source 106.

At operation 402, the NAS client 104A sends a file operation, e.g., a regular IO write, to the NAS source 106 (i.e., a shared storage). At operation 404, the NAS source 106 sends an acknowledgement for the received IO write to the NAS client 104A.

At operation 406, another NAS client, such as the NAS client 104B, sends its file operation, e.g., a regular IO write, to the NAS source 106. At operation 408, the NAS source sends an acknowledgement for the received IO write to the NAS client 104B.

At operation 410, the NAS memory controller 102 (i.e., the central sequencer) sends a data-sync message to all clients, such as the NAS clients 104A and 104B, which includes an indication of a stop time ($T_n$) and a restart time ($T_n+\Delta_n$). At operation 412, the NAS client 104B sends a file operation, i.e., a regular IO write, to the NAS source 106. It is to be noted that no IO writes are sent from NAS clients 104A and 104B to the NAS source 106 between a time interval 420 ($\Delta_n$) that corresponds to the period of time between the stop time ($T_n$) and the restart time ($T_n+\Delta_n$). The time interval 420 ($\Delta_n$) may be referred to as a stop time period as no writes are communicated from the NAS clients 104A and 104B in this time interval 420. In other words, the restart time ($T_n+\Delta_n$) is the indication of the stop time period ($\Delta_n$) added to the stop time ($T_n$).

At operation 414, the NAS client 104A seals its journal within the time interval 420 The journal is then sent later to the NAS memory controller 102. At the stop time ($T_n$), the NAS client 104A closes the current dataset "n" and exactly starts a new dataset "n+1". At this point, the closed dataset "n" that include all completed IOs is marked with success status and then sent as a journal (actually a journal segment) to the NAS memory controller 102. At operation 416, the NAS client 104B receives an acknowledgement for the previous IO write received from the NAS source 106. This acknowledgement is received before the expiration of the restart time ($T_n+\Delta_n$).

At operation 418, the NAS client 104B also seals (i.e., closes) its journal within the time interval 420. Like the NAS client 104A, at the stop time ($T_n$), the client 104B too closes its current dataset "n" and exactly starts its new dataset "n+1". The closed dataset "n" that include all completed IOs is marked with a success status as the sealing at the NAS client 104B occurs before the restart time, i.e., well within the time interval 420. Thereafter, the closed dataset "n" may be sent as its journal (a journal segment) to the NAS memory controller 102 before or after the restart time. Since all the journals are sealed within the given time period (i.e., within the time interval 420) and determined with a successful status (i.e., the NAS clients 104A and 104B closed dataset "n" successfully), the datasets "n" from all clients is marked as crash consistent by the NAS memory controller 102. The successful status is defined as a status when all the IOs initiated by the clients before the stop time ($T_n$) complete before the restart time ($T_n+\Delta_n$). As shown, in the sequence diagram 400, all outstanding IOs are acknowledged by the NAS source 106 before the deadline, i.e., before the restart time ($T_n+\Delta_n$), and all the clients, such as the NAS clients 104A and 104B are also able to send their respective journals to the NAS memory controller 102 before the restart time ($T_n+\Delta_n$), and thus this dataset "n" of file operations in the journal is considered as crash consistent. In an example, datasets may be about 5 seconds in length. Sometimes, datasets can be shorter if there are IO bursts.

Figure 5:
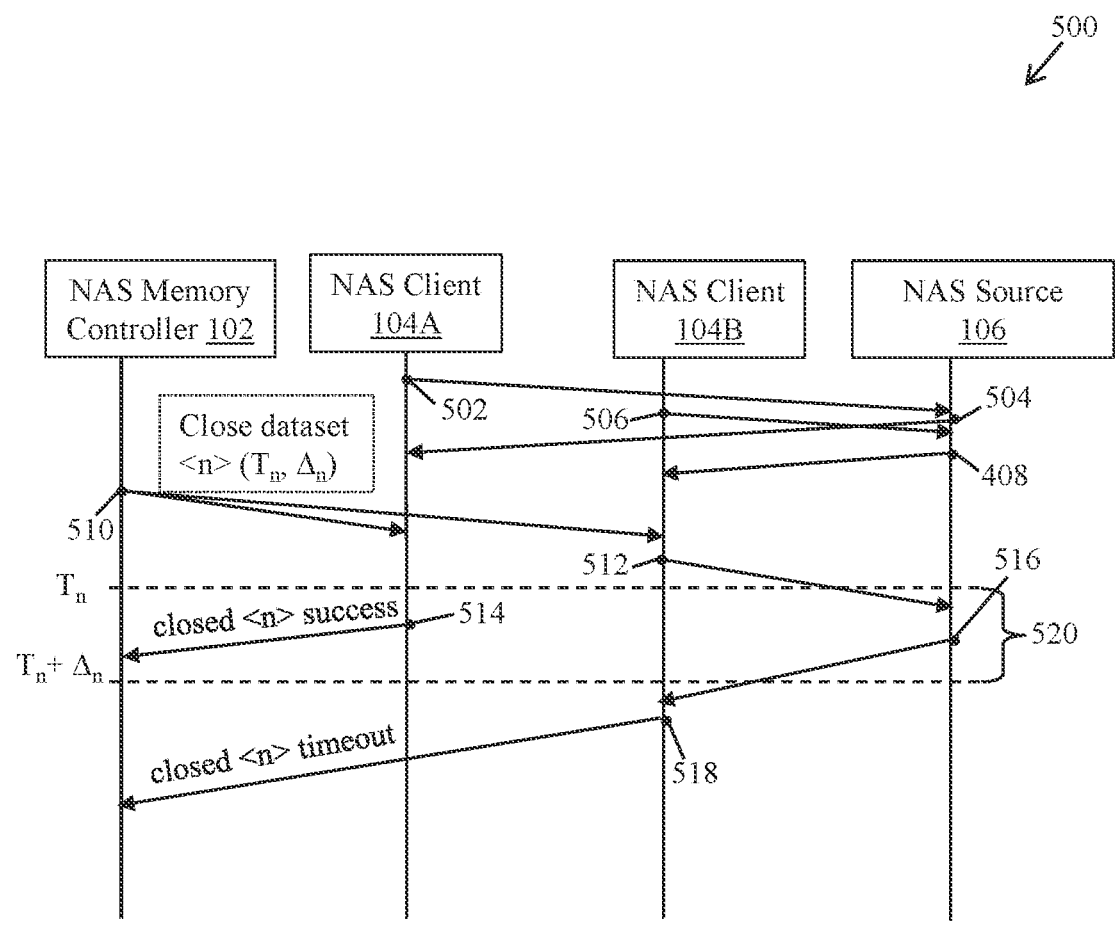
FIG. 5 is an exemplary sequence diagram that depicts crash inconsistent file operations, in accordance with an embodiment of the present disclosure.

FIG. 5 is an exemplary sequence diagram that depicts crash inconsistent file operations, in accordance with an embodiment of the present disclosure. FIG. 5 is described in conjunction with elements of FIGS. 1A, 1B, 1C, 2, and 3. With reference to FIG. 5, there is shown a sequence diagram 500 that depicts an exemplary sequence of operations 502 to 520. There is further shown the NAS memory controller 102, two NAS clients 104A and 104B, and a shared NAS storage, such as the NAS source 106.

At operation 502, the NAS client 104A sends a file operation, e.g., a regular IO write, to the NAS source 106 (i.e., a shared storage). At operation 504, the NAS source sends an acknowledgement for the received IO write to the NAS client 104A.

At operation 506, another NAS client, such as the NAS client 104B, sends its file operation, e.g., a regular IO write, to the NAS source 106. At operation 508, the NAS source sends an acknowledgement for the received IO write to the NAS client 104B.

At operation 510, the NAS memory controller 102 (i.e., the central sequencer) sends a data-sync message to all clients, such as the NAS clients 104A and 104B, which includes an indication of a stop time ($T_n$) to close a dataset "n" and a restart time ($T_n+\Delta_n$). At operation 512, the NAS client 104B sends a file operation, i.e., a regular IO write, to the NAS source 106. It is to be noted that no IO writes are sent from the NAS clients 104A and 104B to the NAS source 106 between a time interval 520 ($\Delta_n$) that corresponds to the period of time between the stop time ($T_n$) and the restart time ($T_n+\Delta_n$). The time interval 520 ($\Delta_n$) may be referred to as a stop time period as no writes are communicated from the NAS clients 104A and 104B in this time interval 520. In other words, the restart time ($T_n+\Delta_n$) is the indication of the stop time period ($\Delta_n$) added to the stop time ($T_n$).

At operation 514, the NAS client 104A seals its journal 102 within the time interval 422. At the stop time ($T_n$), the NAS client 104A closes the current dataset "n" and exactly starts a new dataset "n+1". At this point, the closed dataset "n" that include all completed IOs is marked with success status. The sending of the current dataset "n" as a journal (actually a journal segment) to the NAS memory controller 102 may occur thereafter. At operation 516, the NAS client 104B receives an acknowledgement for the previous IO write received from the NAS source 106. However, in the FIG. 5, this acknowledgement is received at the NAS client 104B after the expiration of the restart time ($T_n+\Delta_n$).

At operation 518, the NAS client 104B seals its journal after the expiration of the time interval 422 with unsuccessful status. Unlike the NAS client 104A, at the stop time ($T_n$), the client 104B fails to close its current dataset "n" with success status, within the time interval 520. Since all the pending I/O operations are not received within the given time period (i.e., within the time interval 520) and thus determined as unsuccessful status (i.e., the NAS client 104B closed dataset "n" timeout), the datasets "n" from all clients is marked as crash inconsistent. The unsuccessful status is defined as a status when all the IOs initiated by all the clients before the stop time ($T_n$) do not complete before the restart time ($T_n+\Delta_n$). As shown, in the sequence diagram 500, not all outstanding IOs are acknowledged by the NAS source 106 before the deadline, i.e., before the restart time ($T_n+\Delta_n$), and some clients, such as the NAS client 104B seals its journal with unsuccessful status before the restart time ($T_n+\Delta_n$), and thus this dataset "n" of file operations in the journal is considered as crash inconsistent. Moreover, the parameter "An" is typically small, around the length of time taken for one NAS IO operation (e.g., about 5 ms). The time interval 520 is larger than the clock sync accuracy, which is typically a few nanoseconds. The time interval 520 i.e., the parameter "An", can be tuned to ensure that some percent, say a defined percent, of the datasets are crash consistent.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A network attached storage NAS memory controller, the NAS memory controller is configured to be operatively connected to one or more NAS clients for shared memory access, each NAS client of the one or more NAS clients comprises a clock and is operatively connected to other NAS clients of the one or more NAS clients through a low-latency communications network, and
the NAS memory controller being configured to:
    transmit an indication of a stop time and a restart time to each of the one or more NAS clients;
    receive a journal of file operations from each of the one or more NAS clients after the stop time arrives; and
    determine a status of each journal.

2. The NAS memory controller according to claim 1, wherein the NAS memory controller is further configured to order file operations of each journal received from each of the one or more NAS clients into one time series of file operations.

3. The NAS memory controller according to claim 1, wherein the NAS memory controller is further configured to cause the journals received from each of the one or more NAS clients to undergo conflict resolution.

4. The NAS memory controller according to claim 1, wherein the NAS memory controller is further configured to cause the journals received from each of the one or more NAS clients to undergo replication.

5. The NAS memory controller according to claim 1, wherein the NAS memory controller is further configured to cause the journals received from each of the one or more NAS clients to undergo further processing.

6. The NAS memory controller according to claim 1, wherein the NAS memory controller is further configured to determine the status of each journal received from the one or more NAS clients by determining for each of the journals whether a journal indicates a successful status, and
    based on determining that the journal indicates the successful status, determining the file operations of the journal to be crash consistent, and
    based on determining the journal indicates an unsuccessful status, determining the file operations of the journal to be crash inconsistent.

7. The NAS memory controller according to claim 1, wherein a journal of a NAS client of the one or more NAS clients comprises all file operations initiated before the stop time by the NAS client that are complete or not before the restart time for that NAS client.

8. The NAS memory controller according to claim 1, wherein the journal includes a time stamp for each file operation.

9. The NAS memory controller according to claim 1, wherein the each file operation of the journal are one of: a write operation, a metadata operation, or a cyclic redundancy check of a read operation.

10. The NAS memory controller according to claim 1, wherein each journal comprises an indication of target, source and relevant operation data for each file operation in the journal.

11. The NAS memory controller according to claim 1, wherein the NAS memory controller is further configured to synchronize clocks of the one or more NAS clients by transmitting an indication of a synchronization.

12. The NAS memory controller according to claim 1, wherein the low-latency communications network is a latency that is shorter than the latency for a file operation.

13. The NAS memory controller according to claim 12, wherein the low-latency communications network is a Local Area Network.

14. The NAS memory controller according to claim 1, wherein the indication of the restart time is transmitted along with the indication of the stop time.

15. The NAS memory controller according to claim 1, wherein the indication of the restart time is the indication of the stop time added to a stop time period known to the one or more NAS clients.

16. A method for use in a NAS memory controller, the NAS memory controller is configured to be operatively connected to one or more NAS clients for shared memory access, each client of the one or more NAS clients comprises an clock and is operatively connected to other NAS clients of the one or more NAS clients through a low-latency communications network, wherein the method comprises:
    transmitting an indication of a stop time and an indication of a restart time to each of the one or more NAS clients;
    receiving a journal of file operations from each of the one or more NAS clients, after the stop time arrives; and
    determining a status of each journal.

17. A non-transitory computer-readable media comprising instructions that when loaded into and executed by the NAS memory controller enables the NAS memory controller to execute the method according to claim 16.

18. A NAS client being configured to be operatively connected to a NAS memory controller through a low-latency communications network for shared memory access, the NAS client comprising a clock and a controller, the controller being configured to:
- synchronize the clock;
- receive an indication of a file operation;
- register the file operation in a journal;
- receive an indication of a stop time and an indication of a restart time from the NAS memory controller;
- determine a stop time based on the indication of a stop time;
- determine a restart time based on the indication of a restart time;
- as the stop time arrives refrain from executing further file operations;
- determine a status of the journal;
- transmit the journal of file operations to the NAS memory controller; and
- as the restart time arrives resume execution of the further file operations.

19. The NAS client according to claim 18, wherein the controller is further configured to determine whether to execute a file operation before the stop time based on a time period between the stop time and the restart time.

20. The NAS client according to claim 19, wherein the controller is further configured to determine whether to execute a file operation before the stop time based on the time period between the stop time and the restart time, wherein a file operation is buffered as a further file operation if an expected time of completion for the file operation is longer than the time period between the stop time and the restart.

* * * * *